March 7, 1933.  J. A. LOGAN  1,900,652
LIQUID DISPENSING APPARATUS
Filed March 2, 1932  2 Sheets-Sheet 1
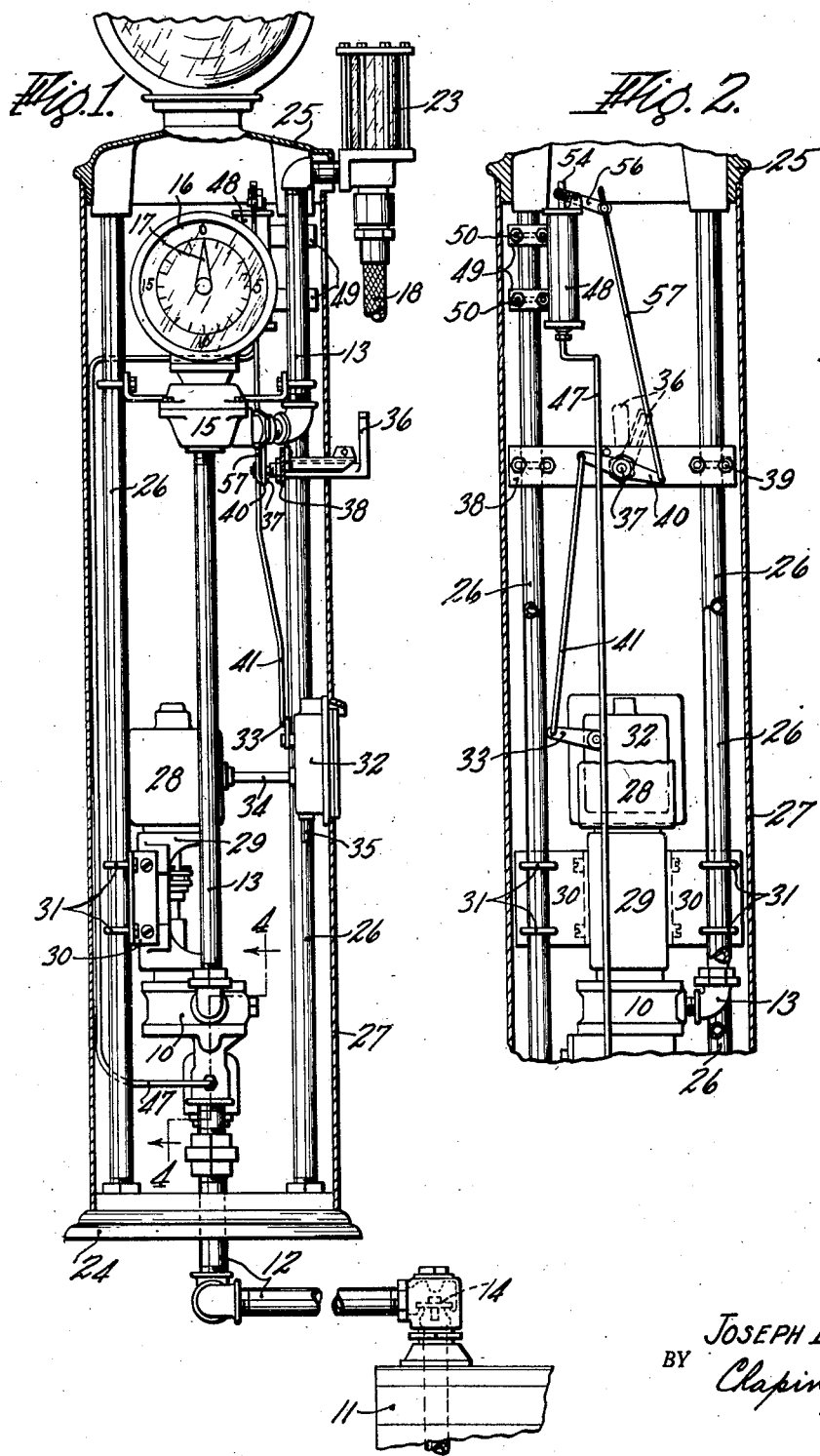
INVENTOR.
JOSEPH A. LOGAN
BY Chapin + Neal
ATTORNEYS.

March 7, 1933.   J. A. LOGAN   1,900,652
LIQUID DISPENSING APPARATUS
Filed March 2, 1932   2 Sheets-Sheet 2
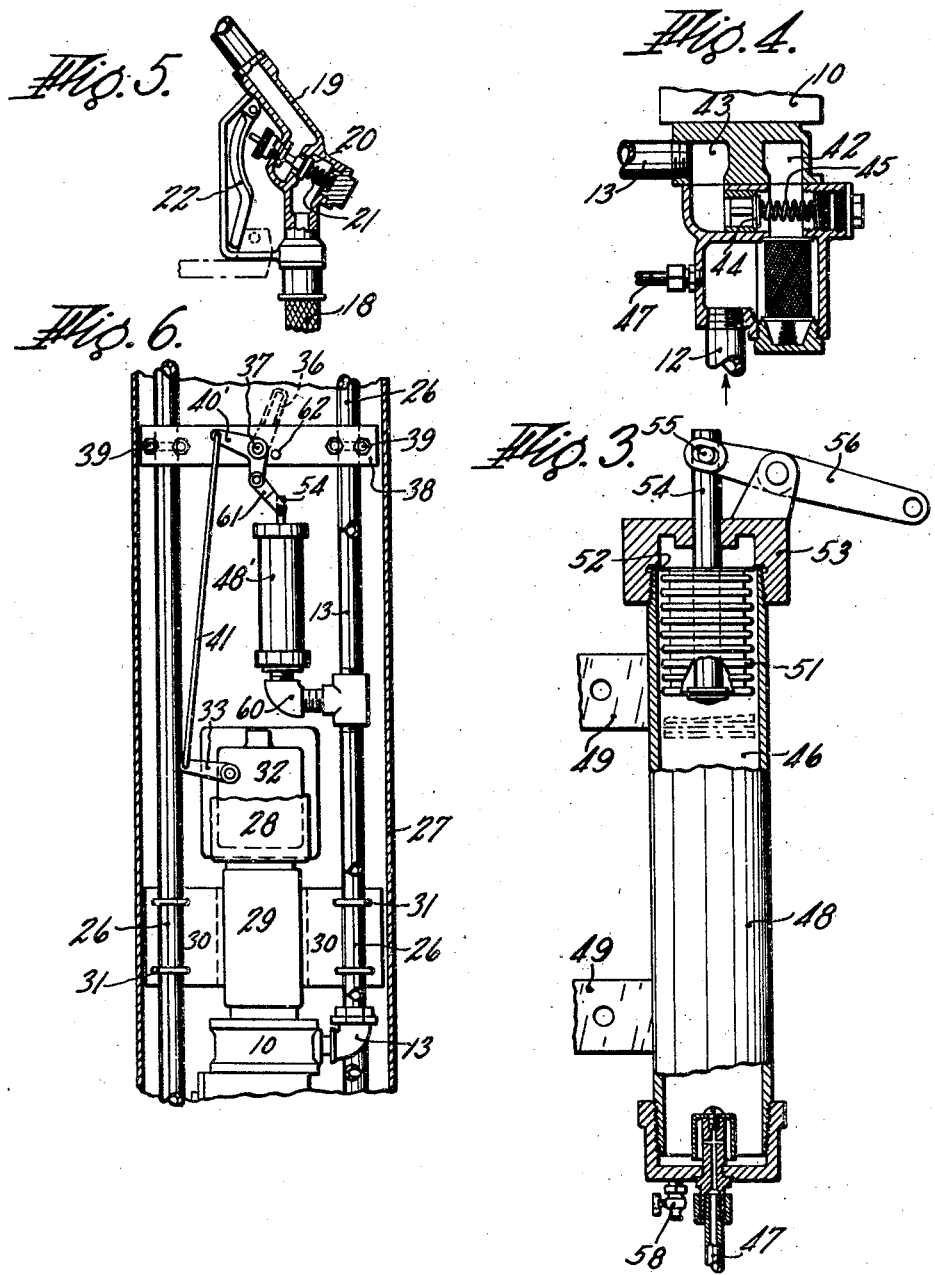
INVENTOR.
JOSEPH A. LOGAN
BY Chapin & Neal
ATTORNEYS.

Patented Mar. 7, 1933

1,900,652

UNITED STATES PATENT OFFICE

JOSEPH A. LOGAN, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID DISPENSING APPARATUS

Application filed March 2, 1932. Serial No. 596,270.

This invention relates to liquid pumping apparatus of the type having associated therewith an expansion chamber, which normally contains air or other gaseous or readily compressible medium trapped therein.

The invention has one advantageous use in connection with gasoline dispensing systems, more especially the closed type systems in which the liquid is usually under substantial pressure, but the invention is readily capable of other and more general applications and is not necessarily confined to the one use disclosed.

The object of the invention is to provide preventative means, effective when the air or equivalent compressible medium in the expansion chamber is depleted, to prevent operation of the liquid pumping apparatus until the defective condition is remedied.

This and other objects will appear as the detailed description proceeds and will be pointed out in the appended claims.

The invention will be disclosed for illustrative purposes with reference to the accom25 panying drawings, in which:—

Fig. 1 is a sectional elevational view of a liquid dispensing apparatus embodying my invention;

Fig. 2 is a fragmentary sectional view taken at right angles to, and looking from the left hand side of Fig. 1;

Fig. 3 is an enlarged elevational view, partly in section, of the expansion chamber member shown in Fig. 1;

Fig. 4 is a fragmentary sectional view of the pump taken on the line 4—4 of Fig. 1;

Fig. 5 is an elevational view, partly in section, of the hose nozzle; and

Fig. 6 is a view taken similarly to Fig. 2 and showing a modification of the invention.

Referring to these drawings; the invention has been disclosed as embodied in a well known form of gasoline dispensing apparatus but the invention is capable of other ap45 plications and is not limited to use in the one type of apparatus disclosed.

As shown in Fig. 1; the dispensing apparatus chosen as a background for the invention includes a suitable pump 10, such as a rotary pump, for drawing up gasoline from a low level supply tank 11 through a suction pipe 12 and forcing such liquid through a discharge pipe 13. A check valve 14 is placed in suction pipe 12 to prevent return flow. A suitable meter 15 is interposed in the discharge pipe 13 to measure the quantities of liquid forced therethrough,—such measured quantities being indicated on a dial 16 by a pointer 17. The discharge pipe terminates with a flexible hose 18, shown in part in Fig. 1, and this hose as shown in Fig. 5, terminates with a hose nozzle 19 having a valve 20 normally closed by a spring 21 but capable of being opened manually by pressure on a handle 22. At the junction of hose 18 and pipe 13, it is usual to place a suitable flow indicator such as 23.

This apparatus is customarily enclosed, except for hose 18 and dial 16, by a suitable casing. As herein shown, the casing includes base and cap members 24 and 25, respectively, which are interconnected by a series of pipe columns 26, and a sheet metal shell 27, which houses in the space between the cap and base.

The pump 10 may be power operated in any suitable way. As shown, it is driven by an electric motor 28, to which it is directly coupled as indicated. Both the motor and pump are fixed to a bracket 29 which is supported from two of the columns 26 by the angle irons 30 and U-bolts 31, as will be clear from Figs. 1 and 2. The motor 18 is controlled by a suitable switch (not shown) which is contained within a box 32 and is operated by a lever 33. A conduit 34 interconnects motor 28 and switch box 32 for carrying the necessary wire connections and a conduit 35 for the supply wires leads to box 32. It is not thought necessary to illustrate or further describe the switch or electrical connections as they are well known. Also a full disclosure will be found in the copending application for U. S. Letters Patent filed jointly by myself and Warren H. DeLancey on December 16, 1931, under Serial No. 581,413.

The switch lever 33 (Fig. 2) is connected to a lever 36 arranged outside the casing 27 for convenient operation. This lever 36 is fixed to a shaft 37, mounted in a suitable bearing, carried by a cross bar 38, fixed by U-bolts 39 to two of the pipe columns 26. Fixed to the inner end of shaft 37 at a point intermediate its ends is an arm 40, one end of which is connected by a link 41 to switch lever 33. When lever 33 is positioned as shown, the motor switch is open and, when moved downwardly by swinging lever 36 into the vertically upstanding position indicated, the switch will be closed.

It is to be noted that the dispensing system described is one which is normally closed. The outlet valve 20 is normally closed and may be left closed for substantial periods of time. Expansion of the liquid in the closed system may occur and it is necessary to provide some means for relieving it. Otherwise, dangerously high pressures might be built up under certain conditions in the closed system. Liquid cannot flow back to tank 11 because of valve 14 and although there is a relief valve in pump 10, this does not do any more than to by-pass the liquid around the pump. As shown in Fig. 4, 42 and 43 are the inlet and outlet ports of pump 10 and a relief valve 44, normally held closed by a spring 45 can open to connect the outlet port to the inlet port after a certain pressure has built up in the discharge pipe 13. But this does not solve the problem because there is no means for the escape of the by-passed liquid from pipe 12.

It has been proposed heretofore to provide an expansion chamber 46 (Fig. 3) which is entirely closed except for a pipe connection 47 between its lower end and the suction side of pump 10 (Fig. 1). I show such a chamber, formed in a member 48 and constructed and mounted according to the disclosure of the W. H. DeLancey U. S. patent application Patent No. 1,870,900, dated August 9, 1932. This member is supported by brackets 49 and U-bolts 50 (Figs. 1 and 2) from one of the pipe columns 26 near the upper end of the casing 27.

The expansion provisions operate in the following manner. Originally, the tube 47 and chamber 46 are filled with air but the first operation of pump 10 will exhaust some of this air and expel it with the gasoline. Since the suction of the pump is applied to tube 47 as well as suction pipe 12, a partial vacuum will be created within the tube and chamber 46. When the desired amount of liquid has been delivered, the hose nozzle valve 20 is closed and then the motor 28 stopped. It is probable that the partial vacuum created in chamber 46 will not long exist but this is not necessary to the success of the invention. If, after the pumping stops, the liquid in the closed system expands under the action of heat, liquid can enter tube 47 and chamber 46, compressing the air therein and relieving the pressure in the system. So also, when the nozzle valve 20 is closed suddenly, rather than gradually, the backward surge of liquid can enter pipe 47 and chamber 46 and relieve the pressure. It is to be noted that liquid can pass back through the meter 15 and through the pump 10, whether or not the by-pass valve 44 of the pump is open. But liquid cannot ordinarily pass back through suction pipe 12 into tank 11 because of the closed check valve 14. Therefore, relief for expansion of the liquid in the closed system and relief for the backward surge of liquid caused by a sudden closing of the hose nozzle valve must be provided and the tube 47 and chamber 46 serve this purpose.

The problem of this invention is to guard against operation of the pumping means in case the supply of air in the expansion chamber 46 becomes depleted. The arrangement will serve to warn the operator that the expansion chamber, being depleted of air, is no longer operative to perform its intended function. Also, it will compel the operator to remedy the condition before he can operate the pumping means. To accomplish these results, I provide in the upper part of the expansion chamber a movable wall, which may advantageously take the form of a "sylphon" bellows 51. The flange 52 of this bellows is fixed to member 48 by a screw cap 53 in such a way that the bellows completely closes in air tight fashion the upper end of chamber 46. Fixed to the lower wall of the bellows is a shaft 54 which extends upwardly through and is slidably mounted in cap 53 and projects above the same, carrying in such projecting portion a pin 55 engaged in a slot in one end of a lever 56. This lever is fulcrumed intermediate its ends on cap 53 and its other end is connected by a link 57 (Fig. 2) to the end of lever 40 opposite to that to which link 41 is connected. It will be clear that when lever 36 is swung into its upstanding vertical position to close the motor switch, the connections just described will effect a downward movement of shaft 54 and an expansion of the bellows 51. For example, the lower wall of the latter will be depressed into a position such as that shown by dotted lines in Fig. 3. So long as there is air in chamber 46, the bellows can be expanded as described to decrease the volume of the chamber but, if the latter becomes filled with liquid, such movement of the bellows will be prevented because of the incompressibility of the liquid. Accordingly, the operator will be unable to move lever 36 far enough to close the motor switch and start the pumping means. A drain valve 58 is provided for chamber 46 for the convenience of the operator in draining liquid therefrom whenever necessary.

It is to be noted that in the operation of the pump 10, the chamber 46 is placed under partial vacuum so that there is no tendency to force the bellows upwardly and cause the motor switch to be thrown to "off" position. If necessary or desired, the bellows 51 may readily be held in expanded position by any suitable means and an example of one such means will appear below in connection with a modification of the invention.

The invention is not confined to use with an expansion or relief chamber of the particular form disclosed nor to such a chamber having a connection with the suction side of the pump. As a matter of fact, the depletion of air from the chamber when connected with the suction side of the pump, is less likely than when the chamber is connected to the pressure side of the pump. The greater the pressure on the gasoline, the more air it will absorb. For example, it has been found that the so-called air domes, often used on the pressure side of a pump to equalize the pulsations of the pumped liquid, gradually fill up with liquid and become ineffective to accomplish their intended work.

In Fig. 6, I show an air dome 48', similar in construction to that shown in Fig. 3 except for the pipe connection at its lower end. The lower end of dome 48' is connected by a pipe 60 to the discharge pipe 13 and this connection is unrestricted as distinguished from the restricted small bore connection shown in Fig. 3. The member 48' is of ordinary construction in every respect except that it embodies the movable wall, such as disclosed in Fig. 3. The shaft 54, connected to such wall, is operated by a link connection 61 (Fig. 6) from one arm of a bell-crank 40', mounted similarly to lever 40 and operated by the lever 36 and serving to operate the motor switch lever 33. The arrangement is such that, when lever 36 is moved to the left into its upstanding vertical position, the bel'crank and link will be moved far enough so that the pivotal connection between them crosses from the left to the right of a line connecting the center of shaft 37 and the pivot connection of link 61 to shaft 54. A stop 62 limits the movement of bellcrank 40' in a counterclockwise direction and holds it and link 61 in the "crossed centers" position. The pressure, produced by pumping and tending to collapse bel'ows 51, then tends to move bellcrank 40' in a counterclockwise direction but such movement is restrained by stop 62. This same expedient for locking the bellows in expanded position could obviously be applied to the first form of the invention described, if found necessary or desirable.

The operation of the dispensing apparatus is the same as usual. The operator throws handle 36 to the left to start the motor operated pump and controls the flow of liquid by the valve lever 22 at the hose nozz'e 19. The new element, the movable wall for the expansion chamber, is tied in with the operating handle 36 so as to prevent movement of this handle into position to start the motor in the event that the air is depleted from the expansion chamber. Thus, the invention offers a safeguard against operation of the pump without proper provisions for expansion and, not only warns the operator of the faulty condition of the expansion chamber, but compels him to remedy the condition as a condition precedent to operation of the pump.

The invention has been disclosed herein, for illustrative purposes but the scope of the invention is defined by the appended claims rather than by the foregoing description.

What I claim is:

1. In combination, a pipe line, means for forcing liquid therethrough, a member affording an expansion chamber connected with said line and normally containing a body of air trapped therein, a control member for said liquid forcing means movable from one position to another to start and stop the same, and means movable with the control member for varying the volume of said chamber and decreasing or increasing the same accordingly as said control member is moved to start or stop liquid forcing means.

2. In combination, a pipe line, means for forcing liquid therethrough, a member affording an expansion chamber connected with said line and normally containing a body of air trapped therein, a control member for said liquid forcing means movable from one position to another to start and stop the same, said expansion chamber having a movable wall, and connecting means between said wall and control member for actuating said wall by the movement of the control member and acting to move said wall inwardly into its chamber to decrease the volume of the same as the control member is moved into position to start said liquid forcing means.

3. In combination, a pipe line, means for forcing liquid therethrough, a member affording an expansion chamber connected with said line and normally containing a body of air trapped therein, a control member for said liquid forcing means movable from one position to another to start and stop the same, said expansion chamber having a movable wall, and means operable by movement of said control member into position to start said forcing means for moving said wall inwardly into said chamber to decrease the volume thereof and for locking said wall in such position until the control member is moved back into position to stop said forcing means.

4. In combination, a pipe line, means for forcing liquid therethrough, a member affording an expansion chamber connected with said line and normally containing a body of air trapped therein, a control member for said liquid forcing means movable from one position to another to start and stop the same, and means operable on depletion of the trapped air in said chamber beyond a predetermined minimum volume to prevent movement of said control member into position to start said liquid forcing means.

5. In combination, a pipe line, power operated means for pumping oil therethrough, an air dome connected with said line and normally containing trapped air, a movable wall in the top of the dome, a control member movable from one position to another to start and stop said power-operated means, and connecting means between the control member and movable wall for moving the wall inwardly by the movement of said control member into position to start said power-operated means, whereby when the air is depleted from the dome and the same is filled with liquid, movement of said wall is prevented because of the incompressibility of the liquid and said control member is thereby held against movement into position to start said power operated means.

6. In combination, power-operated pumping means for liquid, a suction conduit and a discharge conduit thereof, a chambered member normally containing trapped air and connected near its lower end to the suction conduit, a control member movable from one position to another to start and stop said means, and means effective when said member fills with liquid on depletion of the air to prevent movement of said member into position to start said pumping means.

7. In combination, power-operated pumping means for liquid, a suction conduit and a discharge conduit thereof, a chambered member normally containing trapped air and connected near its lower end to the suction conduit, a control member movable from one position to another to start and stop said means, and means movable by and with the control member for varying the volume of said chambered member decreasing or increasing such volume accordingly as said control member is moved to start or stop, respectively, said pumping means.

8. In combination, power-operated pumping means for liquid, a suction conduit and a discharge conduit thereof, a chambered member normally containing trapped air and connected near its lower end to the suction conduit, a control member movable from one position to another to start and stop said means, said chambered member having at its upper end a movable wall, and connecting means between said wall and control member whereby the movement of one will move the other.

9. In combination, power-operated pumping means for liquid, a suction conduit and a discharge conduit thereof, a chambered member normally containing trapped air and connected near its lower end to the suction conduit, a control member movable from one position to another to start and stop said means, said chambered member having at its upper end a movable wall, and connecting means between said wall and control member for actuating said wall by the movement of the control member and effective to move the wall inwardly and decrease the volume of said chambered member when the control member is moved into position to start said pumping means.

10. In combination, power-operated means for pumping liquid, a suction conduit connected to said means and having a check valve therein preventing return flow, a discharge conduit connected to said means and having a normally closed outlet valve, a chambered member connected at its lower end to the suction conduit and otherwise closed and normally containing air trapped therein in the upper part thereof, said member having a movable wall, and a control member movable to start and stop said pumping means and connected to move said wall and effective when moved into position to start said pumping means to move said wall inwardly and decrease the volume of said chambered member.

In testimony whereof I have affixed my signature.

JOSEPH A. LOGAN.